United States Patent
Kestler et al.

(10) Patent No.: US 9,789,954 B2
(45) Date of Patent: Oct. 17, 2017

(54) METHOD OF CONTROLLING BOUNDARY LAYER FLOW

(71) Applicant: ROHR, INC., Chula Vista, CA (US)

(72) Inventors: Steven M. Kestler, Winchester, CA (US); Prithvi Sundar, San Jose, CA (US); Yuan Li, San Jose, CA (US)

(73) Assignee: ROHR, INC., Chula Vista, CA (US)

( * ) Notice: Subject to any disclaimer, the term of this patent is extended or adjusted under 35 U.S.C. 154(b) by 503 days.

(21) Appl. No.: 14/262,319

(22) Filed: Apr. 25, 2014

(65) Prior Publication Data

US 2016/0144949 A1 May 26, 2016

(51) Int. Cl.
| | | |
|---|---|---|
| *B64C 21/06* | (2006.01) | |
| *B64D 33/02* | (2006.01) | |
| *F02C 7/04* | (2006.01) | |
| *B64D 29/00* | (2006.01) | |

(52) U.S. Cl.
CPC ............. *B64C 21/06* (2013.01); *B64D 29/00* (2013.01); *B64D 33/02* (2013.01); *F02C 7/04* (2013.01); *B64C 2230/04* (2013.01); *B64D 2033/0226* (2013.01); *F05D 2270/17* (2013.01); *Y02T 50/166* (2013.01); *Y02T 50/671* (2013.01)

(58) Field of Classification Search
CPC .... B64D 2033/0286; B64D 2033/0226; B64D 29/06; B64D 29/00; Y10T 137/0536; Y10T 137/0645
See application file for complete search history.

(56) References Cited

U.S. PATENT DOCUMENTS

| | | | | |
|---|---|---|---|---|
| 3,951,360 A | * | 4/1976 | Anxionnaz | B64C 21/06 114/67 R |
| 4,993,663 A | * | 2/1991 | Lahti | B64C 21/06 244/130 |
| 5,137,230 A | * | 8/1992 | Coffinberry | B64C 21/06 244/118.5 |
| 5,143,329 A | * | 9/1992 | Coffinberry | F02C 7/277 244/118.5 |
| 5,222,698 A | | 6/1993 | Nelson et al. | |

(Continued)

FOREIGN PATENT DOCUMENTS

| | | |
|---|---|---|
| EP | 2034159 | 3/2009 |
| EP | 2488412 | 8/2012 |

(Continued)

OTHER PUBLICATIONS

Search Report dated Jan. 26, 2017 in French Application No. 1553622.

*Primary Examiner* — Benjamin P Lee
(74) *Attorney, Agent, or Firm* — Snell & Wilmer L.L.P.

(57) ABSTRACT

An aircraft inlet comprising an annular air intake structure defined by an inner surface and an outer surface, a plurality of perforations formed in the outer surface of the aircraft inlet, a plenum chamber situated within the aircraft inlet and configured to receive air entering the plurality of perforations, and/or a plurality of sensors disposed about the outer surface of the aircraft inlet, each sensor associated with a region of the plurality of perforations. Each sensor may comprise a hot film anemometer. The aircraft inlet may further comprise a regulator coupled at one end to the plenum chamber and at another end to a pump, wherein the regulator regulates a suction produced by the pump.

12 Claims, 2 Drawing Sheets

(56) References Cited

U.S. PATENT DOCUMENTS

| | | | | |
|---|---|---|---|---|
| 5,297,765 A * | 3/1994 | Hughes | B64C 21/06 | 244/130 |
| 5,590,854 A * | 1/1997 | Shatz | B64C 1/12 | 244/130 |
| 5,899,416 A * | 5/1999 | Meister | B64C 21/06 | 244/207 |
| 6,068,328 A * | 5/2000 | Gazdzinski | B62D 35/00 | 244/203 |
| 6,685,143 B1 * | 2/2004 | Prince | B64C 5/12 | 244/203 |
| 6,752,358 B1 * | 6/2004 | Williams | B64C 1/12 | 244/208 |
| 6,866,233 B2 * | 3/2005 | Patel | B64C 21/025 | 244/204 |
| 7,048,230 B2 * | 5/2006 | Meyer | B64D 33/02 | 244/130 |
| 7,766,280 B2 * | 8/2010 | Cloft | B64D 33/02 | 244/208 |
| 7,837,155 B2 * | 11/2010 | Meister | B64C 21/06 | 244/209 |
| 7,967,258 B2 * | 6/2011 | Smith | B64C 21/08 | 239/102.2 |
| 8,190,305 B1 * | 5/2012 | Prince | G05D 1/107 | 244/175 |
| 8,282,037 B2 * | 10/2012 | Jain | B64D 29/00 | 244/207 |
| 8,844,553 B2 * | 9/2014 | Zysman | B64D 33/02 | 137/15.1 |
| 8,864,082 B2 * | 10/2014 | Syassen | B64C 21/06 | 244/209 |
| 2004/0129839 A1 * | 7/2004 | Patel | B64C 21/025 | 244/204 |
| 2005/0045774 A1 * | 3/2005 | Hocking | B64C 21/06 | 244/209 |
| 2006/0032988 A1 * | 2/2006 | Webster | F01D 5/145 | 244/207 |
| 2009/0121083 A1 * | 5/2009 | Jain | B64D 29/00 | 244/130 |
| 2009/0155046 A1 * | 6/2009 | Haas | B64D 33/02 | 415/58.4 |
| 2014/0182695 A1 * | 7/2014 | Alvi | F15D 1/008 | 137/13 |
| 2016/0003091 A1 * | 1/2016 | Malecki | B64D 33/02 | 415/1 |

FOREIGN PATENT DOCUMENTS

| | | |
|---|---|---|
| FR | 2647749 | 12/1990 |
| FR | 2697495 | 5/1994 |
| GB | 2285669 | 7/1995 |
| GB | 2402196 | 12/2004 |

* cited by examiner

METHOD OF CONTROLLING BOUNDARY LAYER FLOW

FIELD

The present disclosure relates to the control of laminar flow over an aircraft nacelle, and more particularly to the control of laminar flow over the nacelle inlet.

BACKGROUND

The flow of air immediately adjacent the surface of an aircraft nacelle may be referred to as boundary layer airflow. The manner in which boundary layer air flows over the surface of an aircraft nacelle may impact the operational efficiency of the aircraft. For example, if boundary layer airflow is not laminar, but turbulent (eddying about within the boundary layer), the operational efficiency of the aircraft may decrease in response to the drag produced by the turbulent flow (e.g., frictional drag against the outer surface of the aircraft nacelle). In contrast, if the flow over the nacelle is laminar, the operational efficiency of the aircraft may be expected to increase, because air in the boundary layer flows smoothly over the nacelle, reducing drag.

SUMMARY

An aircraft inlet comprising an annular air intake structure defined by an inner surface and an outer surface, a plurality of perforations formed in the outer surface of the aircraft inlet, a plenum chamber situated within the aircraft inlet and configured to receive air entering the plurality of perforations, and/or a plurality of sensors disposed about the outer surface of the aircraft inlet, each sensor associated with a region of the plurality of perforations. Each sensor may comprise a hot film anemometer. The aircraft inlet may further comprise a regulator coupled at one end to the plenum chamber and at another end to a pump, wherein the regulator regulates a suction produced by the pump. The aircraft inlet may further comprise a pressure discharge element coupled to the pump. Each sensor may be configured to monitor a rate of cooling and/or airflow velocity over its surface. The aircraft inlet may further comprise a controller that receives a signal from each of the plurality of sensors. The controller may adjust a regulator coupled to a pump to control the suction of the pump.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
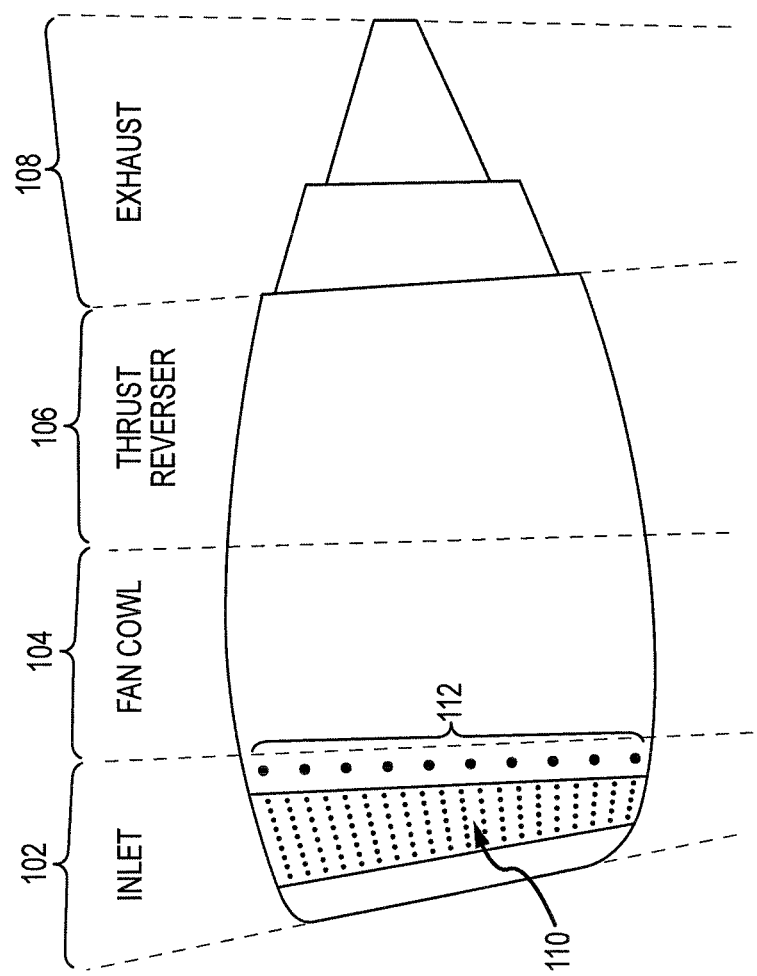
FIG. 1 illustrates, in accordance with various embodiments, a perspective view of an aircraft nacelle having a plurality of micro-perforations or apertures distributed about the surface of an aircraft nacelle inlet.

A nacelle 100 is shown in FIG. 1. As an example, a nacelle 100 typically encloses an engine and is positioned externally of the engine that powers the aircraft to which it is coupled. The nacelle 100, as shown, may be generally divided into four sections. These are the inlet 102, the fan cowl 104, the thrust reverser 106, and the exhaust 108. Though examples given herein generally relate to the forward portion of the nacelle—the inlet the structures, systems, and methods described herein may be applicable to any of the sections described above.

In various embodiments, the inlet may be perforated to form a plurality (perhaps millions) of perforations. These perforations may be grouped into regions, as described herein. With regard to FIG. 1, these perforations are represented in general by element number 110 (and its associated lead arrow).

As air flows in the boundary layer over the inlet 102, it may become turbulent and begin to eddy and swirl within the boundary layer. As described above, this turbulence may increase drag, which may, in turn, reduce efficiency.

To compensate for this effect, conventional systems have incorporated perforations, such as perforations 110. Air may be drawn or taken into these perforations by a pump situated somewhere within the nacelle 100. Conventional systems may, however, take air into the perforations at a constant rate. However, as turbulence in the boundary layer may vary during flight, suction through the perforations at a constant rate may not account for these variations. Thus, constant rate suction may, in fact, and in some situations, worsen turbulence in the boundary layer.

Accordingly, with continuing reference to FIG. 1, a plurality of sensors 112 may be distributed over the surface of a portion of the inlet 102. These sensors 112 may measure, at different points around the circumference of the inlet 102, the turbulence occurring about the perforations 110 formed in the inlet 102. Specifically, each of a plurality of sensors 112 may be associated with a plurality of perforations defining a region of perforations.

In various embodiments, these sensors 112 may comprise hot film anemometers. In general, hot film anemometers comprise very sensitive temperature sensors (see below). As described above, turbulent air comprises eddying and swirling air in the boundary layer. Thus, as it eddies and swirls, turbulent air may flow more slowly over the sensors 112 than air flowing laminarly over the sensors 112. Slower moving (e.g., turbulent) air may not cool the sensors 112 as efficiently as laminar airflow. Thus, the sensors 112 may detect these slight changes in their rates of heat exchange or cooling to determine whether turbulence is occurring and/or a degree of turbulence.

Specifically, during a laminar flow condition in the boundary layer, air should not substantially eddy and swirl in the boundary layer. Thus, during a laminar flow condition, the sensors 112 can detect a relatively constant rate of cooling or heat exchange. In contrast, as air velocity varies during turbulent conditions in the boundary layer, the sensors 112 can detect slight alterations in their rates of cooling or heat exchange to determine that turbulent conditions exist. In various embodiments, the sensors 112 may determine, as well, the extent of turbulence based upon the rate of cooling or heat exchange experienced by the sensors 112.

In addition, as any number of sensors 112 may be distributed about the circumference of the inlet 102, it is possible to detect laminar and turbulent flow conditions over any number of regions or sections of the nacelle inlet 102.

To elaborate, hot film anemometers may be used to measure the instantaneous velocity of a flowing fluid, such as air. Hot film anemometers typically comprise a film comprising a material having a high temperature coefficient of resistance, such as, for example, platinum, tungsten, etc. Temperature variations may be measured in several ways. For example, a feedback system may attempt to maintain a constant current across the anemometer (corresponding to a constant anemometer temperature). As the current needed to maintain the anemometer temperature varies, a measurement of the turbulence may also be obtained. In addition, in various embodiments, the sensor may transmit a signal indicating a level of turbulence to the cockpit and/or otherwise to a pilot.

Stated another way, the sensor 112 may detect the amount of heat being removed from it by the air flowing over it. For example, when the air flowing over the sensor 112 is moving slower, it removes less heat while faster moving air removes more heat. The sensor 112 is able to sense this, because it may be set to a constant temperature above that of the air temperature, and as it tries (through a feedback loop, as described herein) to maintain that temperature in different conditions, the signal it sends may represent the amount of energy it takes to maintain that temperature. When this signal is near constant, the flow over the sensor 112 is laminar since the velocity is generally constant in laminar flow. However, when the signal is erratic, the flow is turbulent as there is a mixture of high and low velocity air over the sensor affecting the amount of heat removal from the anemometer In general, hot wire and hot film anemometers may be welded, soldered, epoxied and the like to a nacelle, and may, in film form, comprise thicknesses between 1 micrometer to 5 micrometers. Moreover, in various embodiments, a protective coating may be placed over each sensor 112, particularly where the heat transfer coefficient is known. The protective coating may be resistant to lightning strikes as well as other damaging conditions (e.g., bird strike).

Hot film anemometers may thus comprise very thin wafers or films of material. Thus, placement of sensors 112 of this type on the outer surface of the inlet 102 may not interfere with the flow of air over the outer nacelle 100 surface. In other words, sensors 112 may not interrupt laminar flow over the outer surface of the nacelle 100. The outer surface of the nacelle 100 may be defined as the surface of the nacelle 100 most radially distant from a centerline of the nacelle 100. In other words, as a nacelle 100 comprises a thickness, the inner surface of the nacelle 100 may be radially closer to the engine, while the outer surface may, relative to the inner surface, radially further from the engine.

Further, sensors 112 of this type may not be as susceptible to ambient noise and are more convenient to implement than many other types of turbulence sensors, such as microphones, which may take inaccurate turbulence readings based on ambient noise. Likewise, hot film anemometers may not require the hardware and space required by sensors such as microphones placed within or without the nacelle, and are, in addition, lighter than other types of sensors, thereby reducing the weight associated with such systems.

Figure 2:
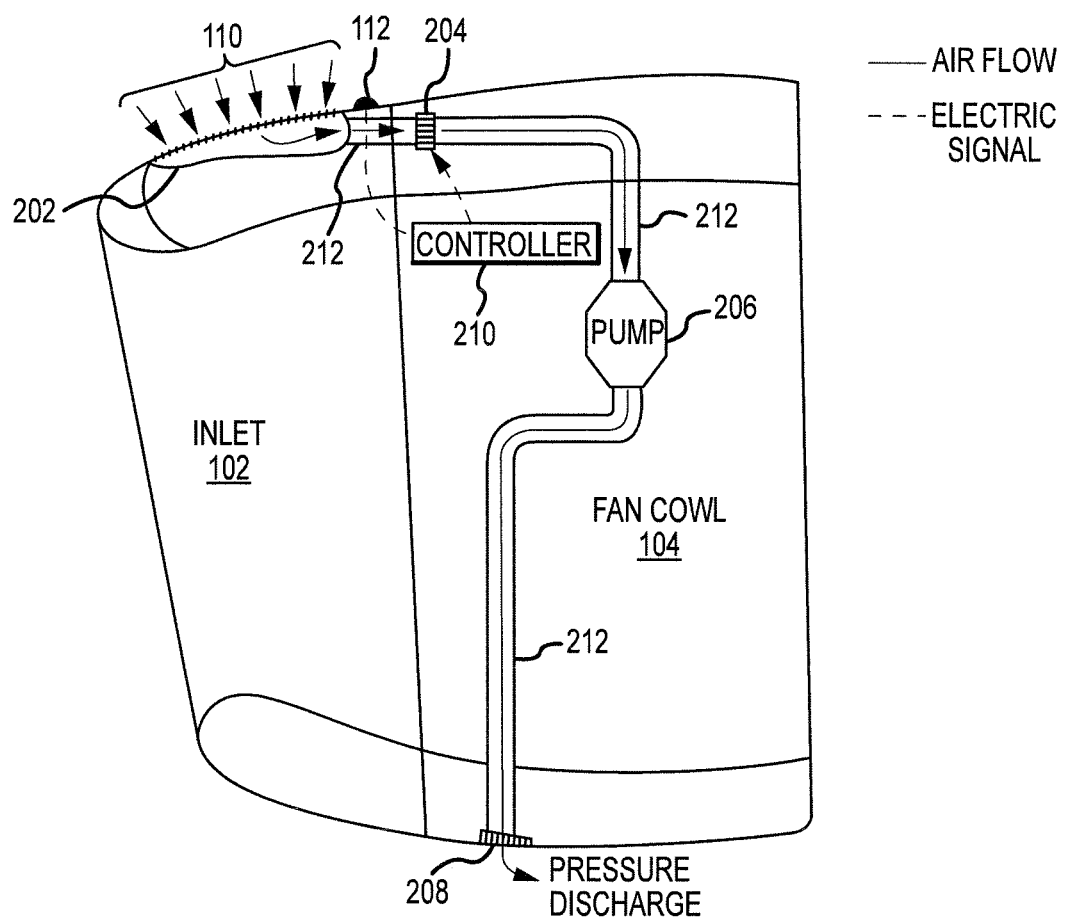
FIG. 2 illustrates, in accordance with various embodiments, a side cross-sectional view of an aircraft nacelle inlet.

With reference now to FIG. 2, a cross-sectional view of an inlet 102 is shown. As shown, the inlet 102 may comprise the plurality of perforations 110 as well as the sensor 112 (again, each of a plurality of perforations may be associated with a particular sensor, the plurality of perforations therefore comprising a region within which a temperature may be determined). The inlet may further comprise, within its thickness, one or more plenum chambers 202 (each associated with a region of perforations). The fan cowl 104 and/or the inlet 102 may also comprise one or more valves and/or regulators 204 (each associated with a region of perforations), a pump 206, a pressure discharge element 208, and/or a controller or microcontroller 210. In various embodiments, the amount of air drawn through the perforations is calibrated to be optimal (i.e., not too great and not too little) to maintain laminar flow over the surface of the nacelle 100. In various embodiments, it may be possible to determine that a system malfunction has occurred, by, for example, determining a consistent area of turbulence, which might be caused by the adherence of an insect or other debris to the external surface of the nacelle 100.

The valves and/or regulators 204, the pump 206, and a pressure discharge element 208, and/or the controller 210 may also be disposed inward of the nacelle 100. For example, any of these structures may be disposed on an inner surface of the inlet 102 and/or fan cowl 104. In various embodiments, the pump 206 may be coupled between a regulator 204 and the pressure discharge element 208 and in fluid communication with the same, such as by a channel or piece of tubing 212. A plenum chamber 202 may be coupled to a regulator 204 and in fluid communication with the same by a similar or same type of channel or piece of tubing 212.

In operation, the pump 206 may draw air through a plurality of perforations and from a plenum chamber 202 associated with those perforations to create a pressure differential between a plenum chamber 202 and the outer surface of the nacelle 100. As this occurs, air in the boundary layer may be drawn into the plenum chamber 202 through the plurality of perforations 110 in the inlet surface 102 to calm eddy currents and turbulence in the boundary layer.

A sensor 112 disposed near the plenum chamber 202 may detect an amount or level of turbulence occurring in the vicinity of the sensor 112, output this reading to the controller 210, which may, based upon a pre-programmed set of instructions, adjust, via the regulator 204, the amount of suction applied to the plenum chamber 202 by pump 206. For example, where a sensor 112 reads a substantial velocity fluctuation in the boundary layer (indicating turbulence around the location of the sensor 112), the sensor 112 may feed this data to the controller 210, which may cause the regulator 204 to increase the suction applied by the pump 206. Likewise, where the sensor 112 reads a relatively constant fluid velocity in the boundary layer, the sensor 112 may feed this data to the controller 210, which may cause the regulator 204 to decrease, eliminate, or leave unchanged the suction applied by the pump 206. As air passes through the pump 206, it may continue to pass through a channel or tube 212 to exit the nacelle 100 via the pressure discharge element 208.

Further, as described above, a plurality of sensors 112 may be placed about the circumference of the inlet 102, each associated with a particular perforated region of the inlet 102. Thus, each sensor 112 may provide a localized reading, thereby permitting localized regulation of suction by the pump 206 about the circumference of the inlet 102.

A controller 210 unit may comprise a computing device (e.g., processor) and an associated memory. Memory may comprise an article of manufacture including a tangible, non-transitory computer-readable storage medium having instructions stored thereon that, in response to execution by a computing device (e.g., processor), cause the computing device to perform various instructions.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "various embodiments", "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A nacelle inlet comprising:
   an annular air intake structure defined by an inner surface and an outer surface;
   a plurality of circumferential regions of perforations formed in the outer surface of the aircraft inlet;
   a plurality of plenum chambers situated within the aircraft inlet, wherein each plenum chamber of the plurality of plenum chambers is configured to receive air entering a respective circumferential region of perforations of the plurality of circumferential regions of perforations;
   a plurality of sensors disposed about the outer surface of the aircraft inlet, wherein each sensor of the plurality of sensors is associated with a respective circumferential region of perforations of the plurality of circumferential regions of perforations;
   a plurality of regulators, wherein each regulator is coupled at a first terminus to a respective plenum chamber of the plurality of plenum chambers and at a second terminus end to
   a pump, wherein each regulator of the plurality of regulators regulates a suction produced by the pump for a respective plenum chamber of the plurality of plenum chambers; and
   a pressure discharge element coupled to the pump, wherein air is configured to pass through the pump and directly exit the nacelle inlet via the pressure discharge element.

2. The nacelle inlet of claim 1, wherein the sensors comprise hot film anemometers.

3. The nacelle inlet of claim 1, wherein the sensors are configured to monitor air velocity fluctuations within the boundary layer.

4. The nacelle inlet of claim 1, further comprising a controller that receives a signal from the sensors.

5. The nacelle inlet of claim 4, wherein the controller adjusts the regulators coupled to the pump to control suction of the pump.

6. A nacelle inlet comprising:
   an annular air intake structure defined by an inner surface and an outer surface;
   a perforation formed in the outer surface of the aircraft inlet, the perforation associated with a first region of a plurality of regions of the outer surface of the aircraft inlet;
   a first plenum chamber, of a plurality of plenum chambers, situated within the aircraft inlet and configured to receive air entering the perforation associated with the first region;
   a first regulator, of a plurality of regulators, coupled at a first terminus to the first plenum chamber and at a second terminus to
   a pump, wherein the first regulator of the plurality of regulators regulates a suction produced by the pump to remove air from the first plenum chamber of the plurality of plenum chambers such that air external to the aircraft inlet is drawn into the perforation associated with the first region;
   a first sensor, of a plurality of sensors, associated with the first region of the perforation; and a pressure discharge element coupled to the pump, wherein air is configured to pass through the pump and directly exit the nacelle inlet, via the pressure discharge element, into ambient.

7. The nacelle inlet of claim 6, wherein the first sensor is a hot film anemometer.

8. The nacelle inlet of claim 7, wherein the hot film anemometer does not interfere with laminar flow over the outer surface of the air intake structure.

9. The nacelle inlet of claim 6, further comprising a controller coupled to the first sensor, wherein the controller receives data from the first sensor associated with a velocity of airflow over the first sensor.

10. The nacelle inlet of claim 9, wherein the controller adjusts the first regulator based on airflow velocity data.

11. The nacelle inlet of claim 9, wherein the controller increases the suction in the first region based upon a fluctuating air velocity reading.

12. The nacelle inlet of claim 9, wherein the controller makes no change to the suction in the first region based upon a non-fluctuating air velocity reading.

* * * * *